Figure 1:
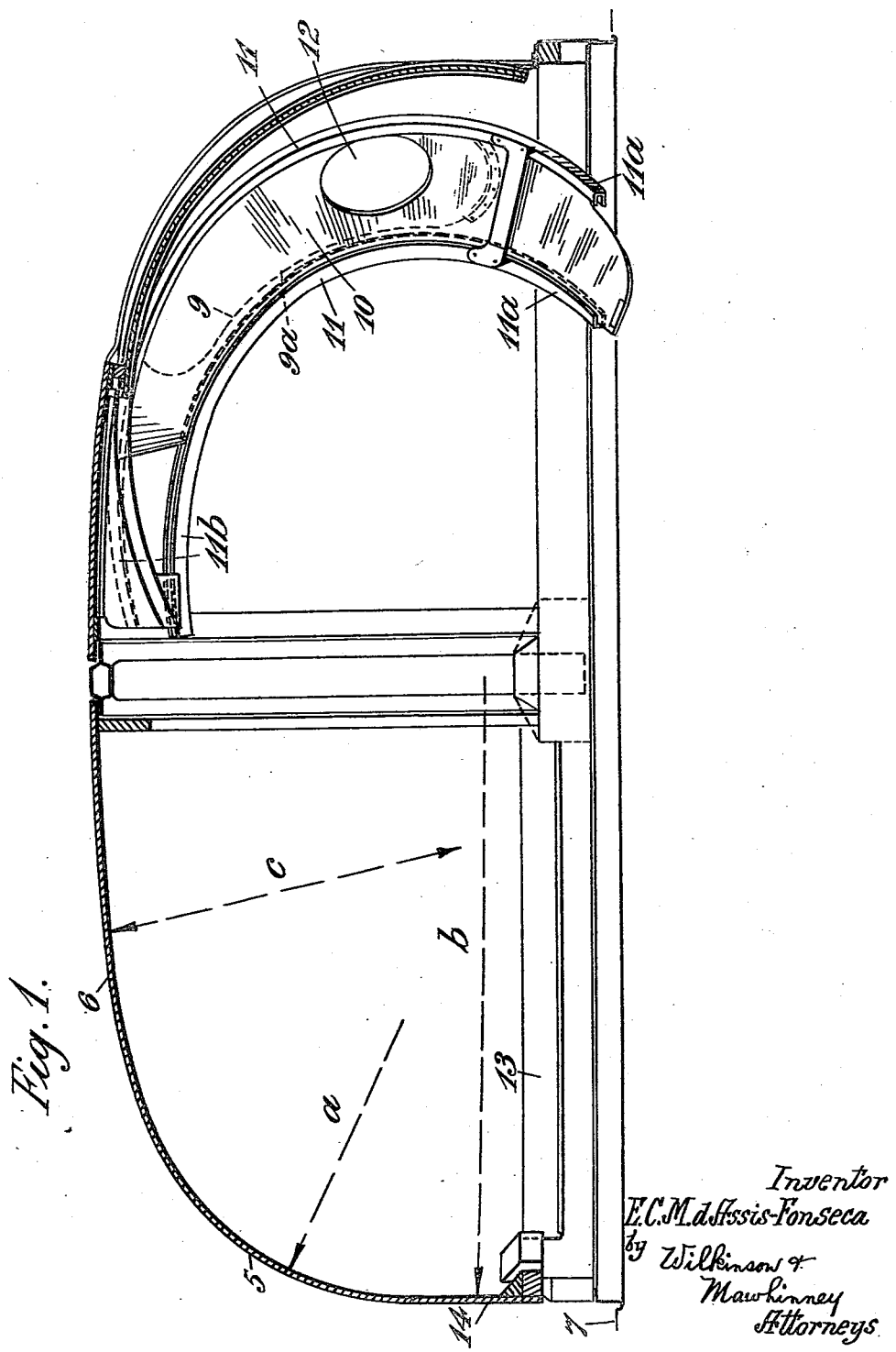

Inventor
E. C. M. d'Assis-Fonseca
by Wilkinson & Mawhinney
Attorneys

Sept. 7, 1948.   E. C. M. D'ASSIS-FONSECA   2,448,704
GUN TURRETS FOR AIRCRAFT
Filed Oct. 28, 1944                 4 Sheets-Sheet 4
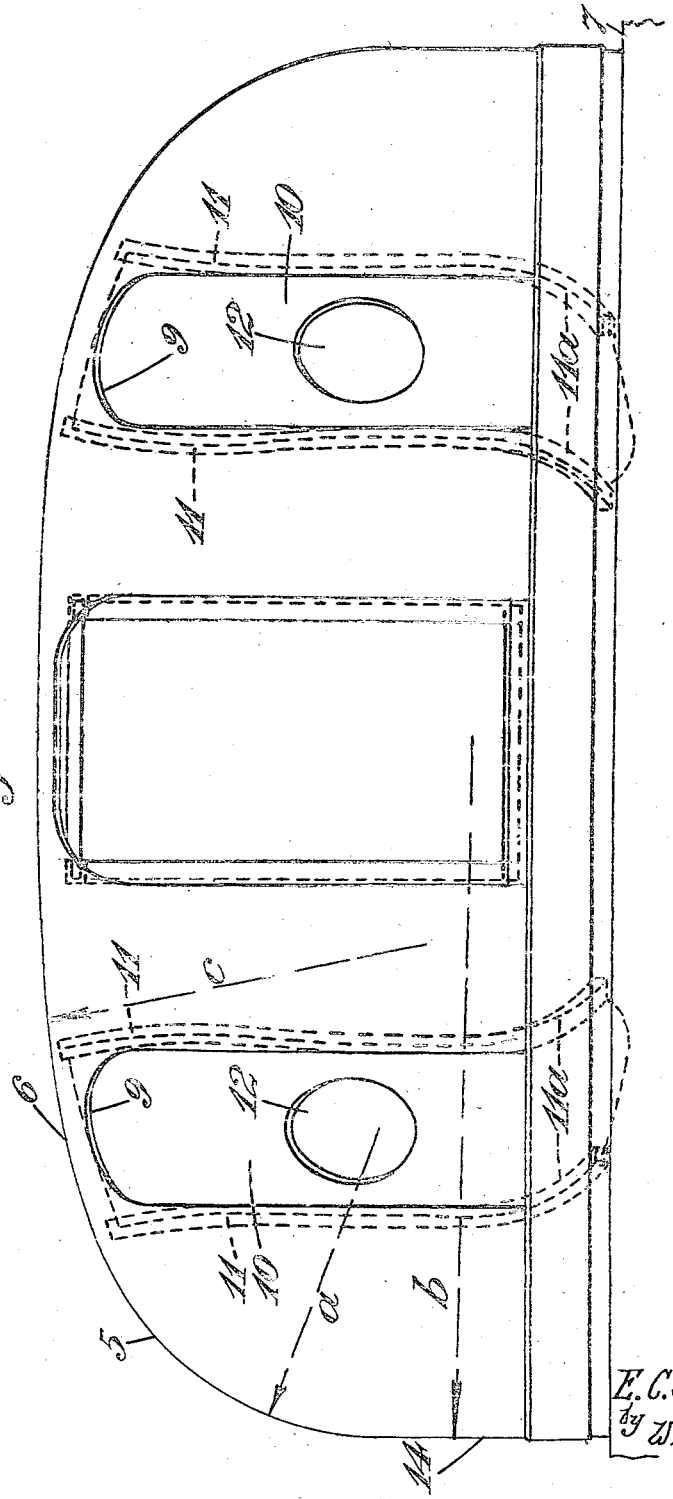
Inventor
E. C. M. d'Assis-Fonseca
by Wilkinson & Mawhinney
Attorneys Patented Sept. 7, 1948

2,448,704

UNITED STATES PATENT OFFICE 2,448,704

GUN TURRET FOR AIRCRAFT

Evelyn Cecil Muschamp d'Assis-Fonseca, Bristol, England, assignor to The Bristol Aeroplane Company Limited, Bristol, England, a British company Application October 28, 1944, Serial No. 560,825
In Great Britain October 4, 1943

Section 1, Public Law 690, August 8, 1946
Patent expires October 4, 1963

4 Claims. (Cl. 89—36)

This invention concerns improvements in or relating to gun turrets for aircraft in which the guns are mounted within and extend through a transparent dome-shaped hood or cupola.

In such gun turrets if the guns point or are capable of being traversed so as to point in the direction of flight of the aeroplane it is desirable that a shield be provided where the guns extend through the cupola so as to reduce or prevent the air which flows over the cupola from passing therethrough. Since the guns are of course capable of elevation the shield should be effective through the arc of elevation.

When the cupola is shaped to a spherical outline (for instance when it is a semi-sphere) the air shield could be constituted by a plate which is also shaped to form part of a sphere and is therefore capable of sliding over the surface of the cupola in any direction. Such a shield would be provided to slide over the elongated slot in the cupola along which the gun is moved for elevation and as the shield conforms to the outline of the cupola in all positions air is prevented from entering. Certain turrets however are not of the uniform outline exhibited by a sphere; they may, for instance, have side walls whose curvature is of a constant radius in elevation which is less than that of the radius of the cupola in plan view. Such cupolas being generally dish-shaped do not readily lend themselves to the provision of an air shield. This invention concerns gun turrets having cupolas of such non-uniform outline and has for its object to provide an improved air-shield therefor.

According to the present invention gun-turrets having cupolas of non-uniform outline are characterised in that an air-shield is provided which is part of a surface of revolution which closely approximates to the outline of the cupola adjacent the gun slot and which is constrained by guide means to move over the said surface of the cupola upon elevation and depression of the gun along a path which lies upon said surface of revolution.

Depending upon the length of the shield in the direction of its movement, and the extent of its movement, the shield may depart from the surface of the cupola at the ends of its movement, where the surface of the cupola no longer conforms with the said surface of revolution.

A specific embodiment of the invention will now be described merely by way of example with reference to the accompanying drawings whereon—

Figure 2:
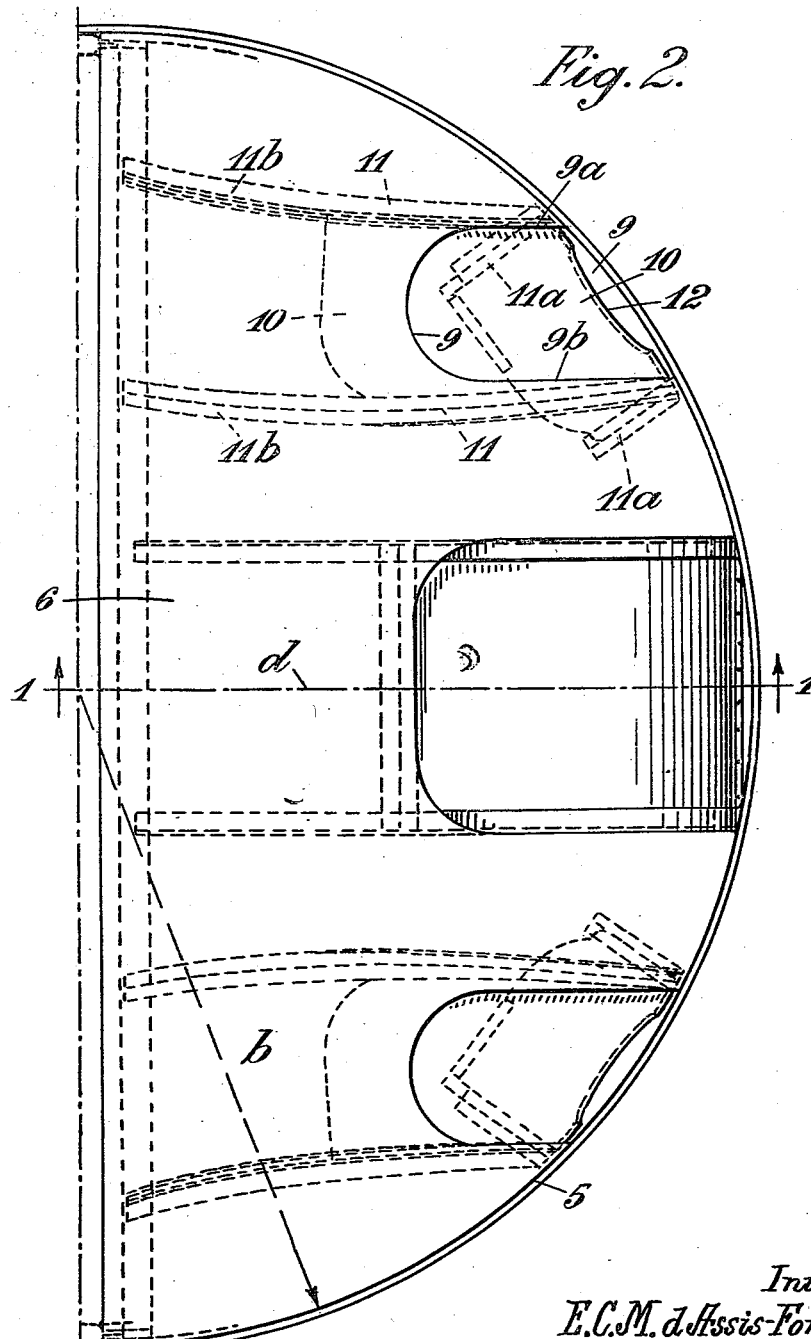
Figure 3:
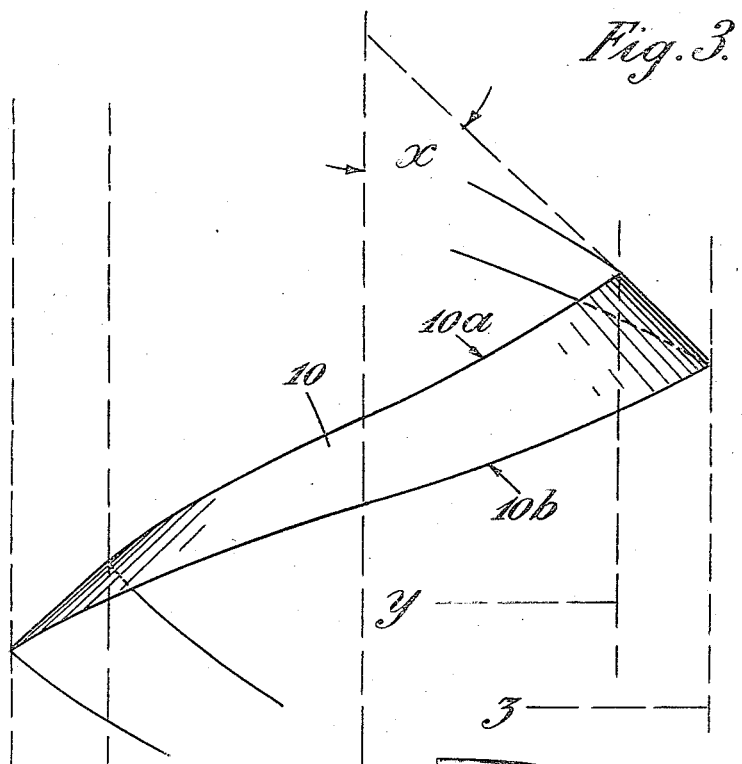
Figure 4:
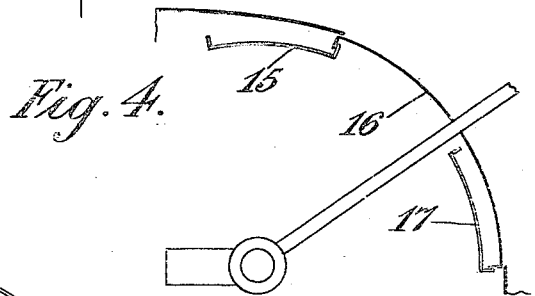
Figure 5:
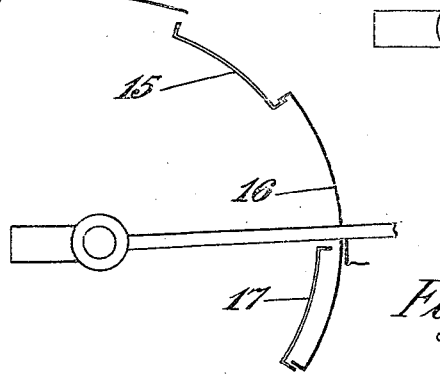

Figure 1 is a section on the line 1—1 of Figure 2, showing a dish-shaped cupola in accordance with the present invention, Figure 2 is a plan view of that half of said cupola through which the guns extend, Figure 3 is a diagrammatic view showing the surface of revolution of which the air-shield forms a part, Figures 4 and 5 are diagrammatic views of a modification, and Figure 6 is a front elevation looking towards the gun slots of the cupola of Figure 1.

Referring to the drawings, the cupola is generally dish-shaped having a side-wall 5 of radius $a$ in elevation and radius $b$ in plan-view, and an upper spherical surface 6 of radius $c$, which blends into the side-wall. The cupola is mounted so as to protrude from the fuselage 7 and is provided with a pair of guns which are disposed one on each side of the diametral axis $d$ shown in Figure 2.

The cupola is capable of rotation along with the guns when the latter are traversed, this rotation being effective through a complete circle. The guns are also capable of being elevated and depressed.

In order to accommodate the elevating movements of the guns it is necessary to cut gun-slots 9 in the transparent material of the cupola. Each of these slots is of sufficient length to permit the guns to move through the arc of elevation.

If it is assumed that in Figures 1 and 2 the guns are pointing in the direction of flight of the aeroplane it will be readily appreciated that unless some means are provided to close the gun-slots 9 some of the air passing over the cupola will be free to pass through these slots. This is a source of inconvenience to the gunner and on prolonged flights may even render him incapable of operating his guns efficiently because of the cold to which he has been subjected.

Accordingly an air shield 10 is provided for each gun-slot, said shield being slidable over the inner surface of the cupola.

Rails 11 are secured to the inside of the cupola and by these the shield 10 is supported in position and guided over the surface of the cupola.

The guns extend through the holes 12 in the shields 10, a sealing ring being disposed between each gun and its associated shield to prevent air entering the cupola.

When the guns are elevated and depressed (which operation is performed by known power means), the barrel of each gun moves the shield along with it. In this way each shield is slid along its guide-rails to seal the gun-slot at whatever position of elevation the gun may be set.

It will have been appreciated that as the function of the air-shield is to prevent the ingress of air to the cupola through the gun-slot 9 it must fit closely against the surface of the cupola along the edges of the gun-slot. It has been found possible to satisfy this condition in the present case by selecting a shape for the air-shield which has been arrived at in the following manner:

The inner edge of the air-shield must conform to the curved outline of the edge 9a of the gun-slot. It has been found that the periphery of a circle of radius $y$ (Figure 3) closely approximates to said curved outline, and accordingly it is assumed that the edge 10a of the air-shield will move around a cylinder of radius $y$ when the shield is moved by raising and lowering the gun. Similarly the outer edge 10b of the air-shield must conform to the curved outline 9b of the gun-slot and it is found that a circle of radius $z$ closely approximates to said curve. It is therefore assumed that the outer edge of the air-shield moves around a cylinder of radius $z$ when it is moved by the gun.

The outline of the shield should conform to the general outline of the cupola at the gun-slot and as it is desired to reproduce said shield from a flat strip of material, the air-shield is made plane in a direction transverse to the direction of movement of the shield. As a consequence the air-shield extends chordwise to the cupola surface from the edge 9a to the edge 9b of the gun-slot.

To allow for the changes in the curvature of the cupola which occur over the length of the gun-slot in a direction transverse thereto without the necessity of unduly warping the air-shield to comply with such changes, it has been found satisfactory to form the air-shield so that its inner edge lies upon a helix to the cylinder of radius $y$ and its outer edge lies upon a helix to the cylinder of radius $z$.

Figure 3 shows in a diagrammatic manner the geometrical requirements which the air-shield must meet so that it moves smoothly over the surface of the cupola at the gun-slot and forms an air-tight joint therewith.

The inner edge 10a lies upon a cylinder whose radius is $y$ and whose periphery closely approximates to the curved outline of edge 9a of the gun-slot. The outer edge 10b lies upon a concentric cylinder whose radius is $z$ and whose periphery closely approximates to the curved outline of edge 9b of the gun-slot. The air-shield is inclined to the common longitudinal axis of the cylinders at an angle $x$, this angle being the same as that which a chord to the cupola-surface which passes through the edges of the gun slot mid-way along the length of said slot will make with said common axis. Finally the shield forms a surface of revolution such that edges 10a and 10b respectively form a helix with the cylinders of radius $y$ and $z$.

The guide-rails 11 are secured to the cupola-surface so that the air-shield will move over the helical surface of revolution shown in Figure 3. That is, the guide-rails lie respectively upon the helices to the cylinders of radius $y$ and $z$. Although secured to the surface of the cupola the rails do not follow its contour throughout their length. Adjacent the gun-slot, the rails closely follow the cupola-surface since the air-shield has been constructed to be in intimate contact with the cupola throughout the length of the slot. At their ends 11a, 11b, however, the rails depart from the cupola-surface (see Figure 1) in order to follow the helical path referred to, thereby ensuring that the air-shield moves over a surface of revolution of constant radius.

The rails 11 in departing from the cupola surface at 11a clear a ring 13 (Figure 1) which is formed around the straight-sided skirt portion 14 of the cupola and thus ensure that the air-shield is guided past said ring.

It is also desirable that the air-shields should not impair the view of the gunner and this is catered for by making the part of the shield which lies above the gun-barrels of transparent material. That part of the shield below the gun-barrels may be made from sheet metal and riveted to the upper transparent panel, or a one piece shield of transparent material may be provided.

In certain cases it may be found that the length of the air-shields is excessive and this difficulty may be overcome as diagrammatically illustrated in Figures 4 and 5 by forming each air-shield in two or more portions 15, 16, 17 so that as it is moved upwardly on elevating the guns, one portion 16 is caused to slide over another portion 17 and lie in superposed relationship at a point in the path of the air-shield which is above the gun-slot. When the guns are depressed from the most elevated position, the portion 16 of each air-shield is moved downwards into position to cover the gun-slot whilst the other portion 15 remains stationary until the first portion 16 is fully extended whereupon it draws, in succession, the other portion 15 into position to cover the gun-slot. A similar action takes place with the portion 17.

I claim:

1. A gun turret comprising a cupola circular in plan, dish-shaped with a curved side wall of smaller radius than the plan radius and a generally flat top and having a slot in its side wall extending upwardly and part-way over the top of the cupola in a chordwise direction, guide means on the cupola extending along each side of the slot, and a strip of flexible material as an air-shield to close the slot and movable along the guide means, the strip being so shaped that its long edges define helices the radii of which approximate to the normal distances from a diametral axis to the edges of said slot.

2. A gun turret comprising a cupola circular in plan, dish-shaped with a curved side wall of smaller radius than the plan radius and a generally flat top and having a slot in its side wall extending upwardly and part-way over the top of the cupola in a chordwise direction, guide means on the cupola extending along each side of the slot, and a strip of flexible material comprising a plurality of portions which are movable relatively to one another along said guide means, the portions being so shaped that the long edges of the strip define helices the radii of which approximate to the normal distances from a diametral axis to the edges of said slot.

3. A gun turret comprising a cupola circular in plan, dish-shaped with a curved side wall of smaller radius than the plan radius and a generally flat top and having a pair of parallel slots in its side wall extending upwardly and part-way over the top of the cupola in a chordwise direction, guide means on the cupola extending along each side of each slot, and a strip of flexible material as an air-shield to close each slot and movable along the guide means, each strip being so shaped that its long edges define helices the radii of which approximate to the normal distances from a diametral axis to the edges of said slot.

4. A gun turret comprising a cupola circular in plan, dish-shaped with a curved side wall of smaller radius than the plan radius and a generally flat top and having a pair of parallel slots in its side wall extending upwardly and part-way over the top of the cupola in a chordwise direction, guide means on the cupola extending along each side of each slot and for each gun slot a strip of flexible material comprising a plurality of portions which are movable relatively to one another along its associated guide means, the portions being so shaped that the long edges of each strip define helices the radii of which approximate to the normal distances from a diametral axis to the edges of said slot.

EVELYN CECIL MUSCHAMP
D'ASSIS-FONSECA.

REFERENCES CITED

The following references are of record in the file of this patent:

UNITED STATES PATENTS

| Number | Name | Date |
| --- | --- | --- |
| 2,175,852 | Perkins | Oct. 10, 1939 |
| 2,199,971 | Sanders | May 7, 1940 |
| 2,206,065 | Trimbach et al. | July 2, 1940 |
| 2,286,341 | Burnelli | June 16, 1942 |
| 2,353,086 | Schaaff | July 4, 1944 |

FOREIGN PATENTS

| Number | Country | Date |
| --- | --- | --- |
| 734,079 | France | July 25, 1932 |
| 776,317 | France | Oct. 31, 1934 |
| 365,912 | Italy | Dec. 15, 1938 |
| 458,204 | Great Britain | Dec. 15, 1936 |
| 520,884 | Great Britain | May 7, 1940 |